United States Patent [19]

Siler

[11] 3,829,765

[45] Aug. 13, 1974

[54] ELECTRONIC APPARATUS FOR DETECTION AND IDENTIFICATION OF ENERGIZED AND/OR NONENERGIZED ELECTRICAL CONDUCTORS

[76] Inventor: Lawrence L. Siler, 2175 S.W. 79th Ave., Portland, Oreg. 97225

[22] Filed: Dec. 26, 1972

[21] Appl. No.: 318,283

Related U.S. Application Data

[63] Continuation of Ser. No. 121,273, March 5, 1971, abandoned.

[52] U.S. Cl. ............................................. 324/67
[51] Int. Cl. ...................... G01r 19/16, G01r 31/02
[58] Field of Search ........... 324/52, 66, 67; 340/310

[56] References Cited
UNITED STATES PATENTS

| | | | |
|---|---|---|---|
| 2,133,384 | 10/1938 | Fisher et al. | 324/66 |
| 2,291,533 | 7/1942 | Cummings | 324/52 X |
| 2,651,021 | 9/1953 | Hays | 324/52 |
| 2,993,167 | 7/1961 | Smith | 324/52 |
| 3,274,489 | 9/1966 | Behr | 324/52 |
| 3,334,340 | 8/1967 | McConnell | 340/310 X |
| 3,441,842 | 4/1969 | Sturm | 324/52 |
| 3,529,216 | 9/1970 | Kolm et al. | 340/310 X |
| 3,641,536 | 2/1972 | Prosprich | 340/310 X |

FOREIGN PATENTS OR APPLICATIONS 1,162,811  8/1969  Great Britain ........................ 324/52

*Primary Examiner*—Gerard R. Strecker
*Attorney, Agent, or Firm*—Jay M. Cantor

[57] ABSTRACT

An electrical circuit locator means comprises signal generator means connectable to electrical lead means at one location and indicator means electrically connectable to the electrical lead means at another location to indicate the correct electrical lead means from among other adjacent electrical lead means.

3 Claims, 4 Drawing Figures

3,829,765

INVENTOR
LAWRENCE L. SILER

INVENTOR
LAWRENCE L. SILER

ELECTRONIC APPARATUS FOR DETECTION AND IDENTIFICATION OF ENERGIZED AND/OR NONENERGIZED ELECTRICAL CONDUCTORS

This is a continuation of application Ser. No. 121,273, filed Mar. 5, 1971, now abandoned.

This invention relates to electrical circuit means and especially electrical circuit means for locating electrical lead means from among other adjacent electrical lead means.

In accordance with the prevailing electrical code, all circuits extending through a building must be properly labeled in order to identify their use and to enable tracing the circuits throughout the building from the fused circuit breaker, circuit breaker distribution panels, through junction boxes to the places where the circuits are to be utilized.

If the circuits have not been properly labeled, the labels have been lost, the circuits have been changed or additional circuits have been added without proper identification, it then becomes necessary to identify the circuits in order to make sure where the circuits are located for safety of personnel or to assure overloading does not occur on existing circuits. Frequently. location of these circuits has to be done while they are energized.

An object of the invention is to provide electrical circuit means for locating and identifying electrical lead means.

Another object is the provision of triggerable load means or signal generator means for applying a discernable periodic electrical current onto electrical lead means to be located.

A further object is to provide indicator means for electrical connection with the electrical lead means to be located to provide an indication when the periodic electrical current or discrete signal is transmitted therealong by the signal generator means.

An additional object is the provision of a cam-operated switch to impress a load on the lead means to be located which constitutes the signal generator means.

A still further object is to provide a transistorized signal generator to apply discrete signal means on the lead means to be located which constitute the signal generator means.

The foregoing and other objects are attained by the following detailed description of the invention which is merely representative thereof and other objects and advantages will be apparent therefrom and from the attached drawings of which:

Figure 1:
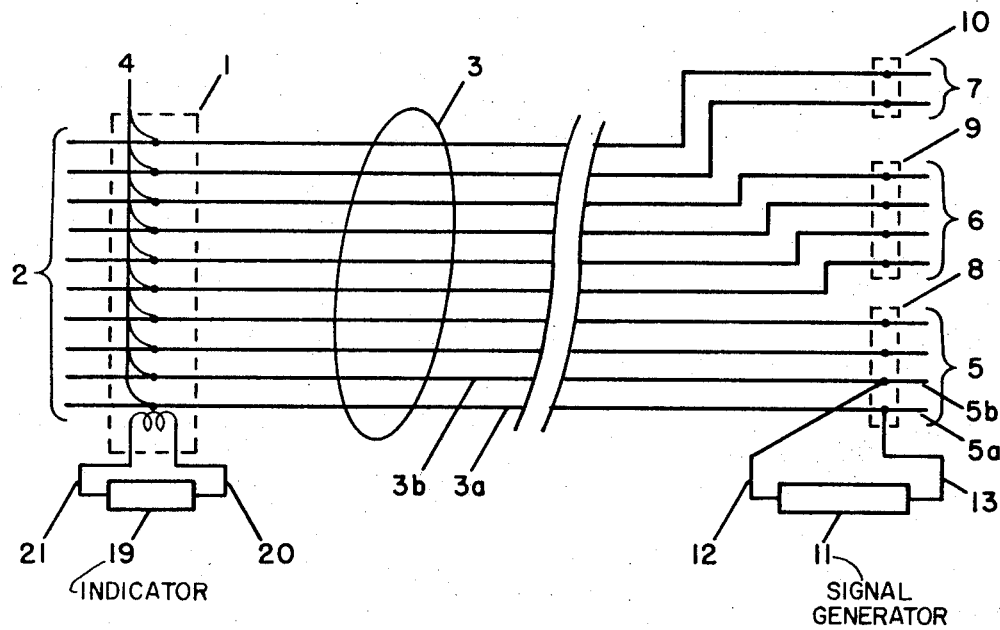
FIG. 1 is a block diagram of the invention.
Figure 2:
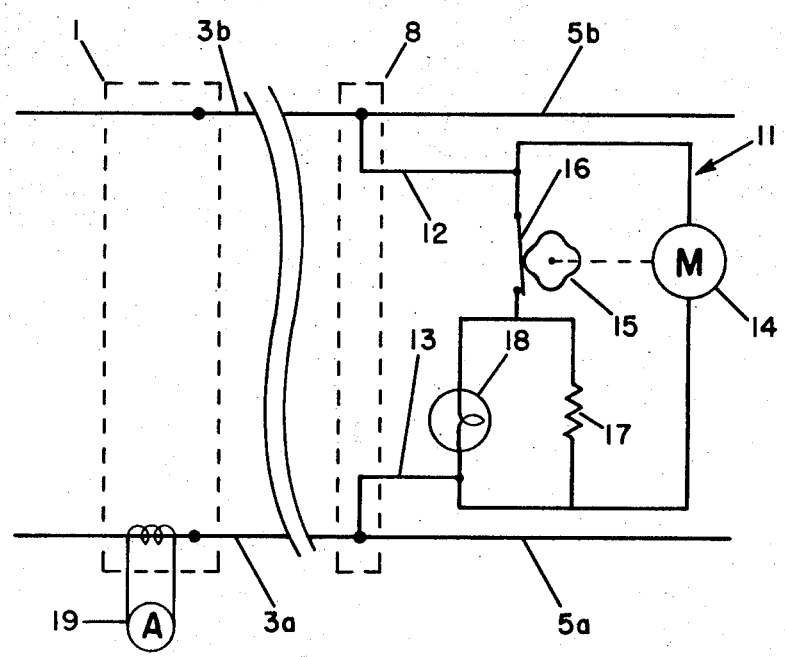
FIG. 2 is a schematic diagram of one embodiment.

Turning now to the drawings and especially FIGS. 1 and 2, a panel 1 is located in some part of a building and it can be a supply panel properly fused or it can be an intermediate panel. Electrical leads 2 constitute either a supply buss in the case of a supply panel or individual leads connecting certain electrical loads to a source of electrical supply in the case of an intermediate panel.

Electrical leads 2 are connected to outgoing electrical leads 3 at connection points 4 in panel 1 and leads 3 are connected to respective leads 5, 6 and 7 in panels 8, 9 and 10 which are disposed at different locations in the building to supply electrical power thereto.

Assume that leads 5a and 5b in panel 8 are not labeled and it is desired to trace these leads connected to respective leads 3a and 3b back to panel 1. In order to locate these leads therein while they are in their energized condition a signal generator 11 is connected across the connection between leads 3a, 3b, 5a and 5b in panel 8 via leads 12 and 13.

Signal generator 11, as illustrated in FIG. 2, comprises an electric motor 14 connected across leads 12 and 13 and it rotates cam 15. A spring-biased switch arm of switch 16 is engaged by cam 15 to open and close the load circuit constituting a resistor 17 and light 18 which are connected in parallel with one another but in series with switch 16. This load circuit and switch are connected in shunt with motor 14.

Leads 12 and 13 are connected to a suitable power source to operate signal generator 11 so that motor 14 operates to cause switch 16 to make and break the load circuit at an optimum periodic rate of 15 interruptions per minute. Such action adds an additional periodic current load onto the existing load carried on the electrical leads which is an additive current to the circuit.

This periodic additional current can readily be indicated on indicator 19 which is an ammeter and connected around the leads of connections 4 in panel 1 until the periodic current is indicated thereby. In this manner, unmarked electrical leads can readily be traced from panel to panel while the leads are maintained in their energized condition thereby precluding de-energization of the leads to that existing power requirements do not have to be interrupted.

Light 18 is unnecessary, but it serves to indicate that the signal generator or pulser is operating and that work is being performed on energized leads. The pulser can also operate when the leads are in an unloaded condition since the periodic current will be transmitted along the selected leads and show up on the ammeter when it is connected thereto. The pulser can be used on all voltage levels from 110 to 48 volts, the present range of voltage levels in use in housing and industrial facilities.

Figure 3:
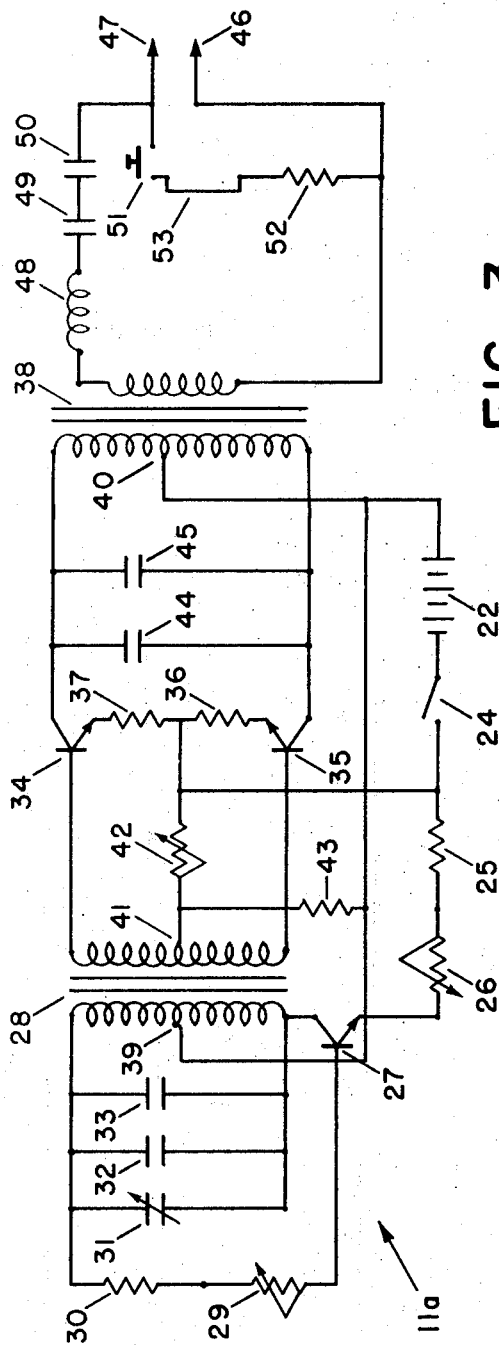
FIG. 3 is a schematic diagram of the signal generator of another embodiment.

Turning now to FIG. 3, signal generator 11a is illustrated. A battery 22 provides a source of power. The negative terminal of battery 22 is connected via switch 24 and serially-connected resistor 25 and variable resistor 26 to the emitter of transistor 27 of an oscillator circuit. The collector of transistor 27 is connected to one side of the primary winding of step-up transformer 28 while the base thereof is connected via serially-connected variable resistor 29 and resistor 30 to the other side of this primary winding. A variable capacitor 31 and capacitors 32 and 33 are connected in parallel with the primary winding.

The R-C combination of resistors 29, 30 and capacitors 31–33 provides a specified frequency of preferably 5KHZ with variable resistor 26 controlling amplitude and variable resistor 29 and variable capacitor 31 controlling the frequency of the oscillator circuit.

The secondary winding of transformer 28 provides an input for an amplifier circuit and this winding is connected respectively to the bases of transistors 34, 35 and the emitters of these transistors are connected to series-connected resistors 36, 37. The collectors of transistors 34, 35 are connected respectively to a primary winding of a step-down transformer 38.

A center tap 39 of the primary winding of transformer 28 is connected to a center tap 40 of the primary winding of transformer 38 and these center taps are connected to the positive terminal of battery 22. A center tap 41 is connected via trimming potentiometer 42 to the junction of resistors 36, 37. One side of potentiometer 42 is connected between resistor 25 and switch 24. Capacitors 44, 45 are connected across the collectors of transistors 34, 35 to increase the signal appearing along the primary winding of transformer 38.

The secondary of transformer 38 has one side connected to an output terminal 46 while the other side of the secondary is connected to another output terminal 47 via series-connected inductive coil 48 and capacitors 49, 50 which filter out 60 cycle signals. A switch 51 in series with resistor 52 is connected in shunt with terminals 46, 47 to provide a test loop which will be described hereinafter.

Figure 4:
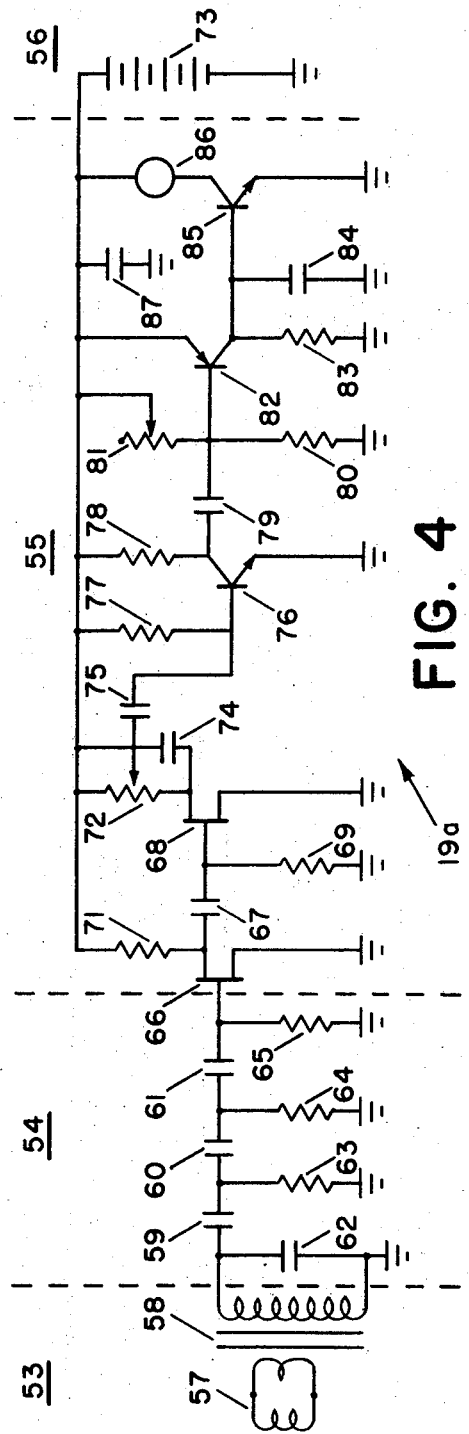
FIG. 4 is a schematic diagram of an indicator for use with the signal generator of FIG. 3.

FIG. 4 illustrates indicating means 19a used to indicate which leads in panel 1 of FIG. 1 are carrying the 5KHZ signal being generated by signal generator 11a when such signal is applied to any pair of leads in panels 8–10. This indicating means comprises a pick-up circuit 53, a filter-discriminator circuit 54, an amplifier circuit 55 and a power circuit 56.

Pick-up circuit 53 includes a figure eight coil 57 having its ends connected to a primary winding of a step-up transformer 58. Coil 57 is the signal pick-up coil. When positioned in the proximity of a conductor carrying a 5KHZ signal (i.e., such as supplied from the generator FIG. 3) it is inductively coupled into this coil and from there fed into the primary winding of the step-up transformer 58. Filter-discriminator circuit 54 comprises the secondary winding of transformer 58 which has one side connected to series-connected capacitors 59, 60 and 61 while the other side is connected to ground. Capacitor 62 is connected in shunt with the secondary winding of transformer 58. One side of capacitors 59, 60 and 61 are connected to ground via resistors 63, 64 and 65 respectively. Filter-discriminator circuit 54 filters out 60 cycles and passes the 5KHZ signal.

Amplifier 55 includes field effect transistor (hereinafter FET) 66 which has its gate connected to capacitor 61. The source electrode of FET 66 is connected to ground while the drain is connected via capacitor 67 to the gate of FET 68. A resistor 69 connects capacitor 67 and the gate of FET 68 to ground. The source electrode of FET 68 is connected to ground. The drains of FET's 66 and 68 are connected to lead 70 via resistor 71 and variable resistor 72. Lead 70 is connected to the positive voltage terminal of battery 73 of power supply 56; the negative terminal of battery 73 being connected to ground. A capacitor 74 also connects the drain of FET 68 to lead 70.

The movable arm of variable resistor 72 is connected via capacitor 75 to the base of transistor 76 while the emitter thereof is connected to ground. A resistor 77 connects the base of transistor 76 to lead 70. The collector of transistor 76 is connected to lead 70 via resistor 78 and via capacitor 79 to the junction of resistor 80 and variable resistor 81. Resistor 80 is connected to ground while the movable arm of variable resistor 81 is connected to lead 70.

The junction of resistor 80 and variable resistor 81 is also connected to the base of transistor 82 and its emitter is connected directly to lead 70 while the collector is connected to ground by resistor 83 and capacitor 84 and also to the base of transistor 85. The emitter of transistor 85 is connected to ground while the collector is connected via indicating means 86 to lead 70. A capacitor 87 connects lead 70 to ground and acts as a filter. FET's 66 and 68 preamplify the 5KHZ signal which is further amplified by transistors 76, 82 and 85. The amplification accomplished by transistor 82, 85 is non-linear and produces the rectifying action so that a DC signal proportional to the incoming signal energizes indicator means 86 thereby indicating that selected leads in panel 1 are located on which the signal generator 11a has applied the 5KHZ signal in any of panels 8–10. No other leads will have this signal thereon. Variable resistor 72 controls the signal magnitude of the input signal while variable resistor 81 controls operation of indicator means 86.

When test switch 51 of FIG. 3 is closed, and the signal generator is operating the pick-up coil 57 of FIG. 4 when placed adjacent test loop 53 will pick up the 5KHZ signal to cause indicator 86 to operate thereby assuring that the system is properly operating before use thereof.

As can be discerned from the foregoing, there has been described and illustrated embodiments of the present invention for positively locating electrical leads; however, it is to be understood that these embodiments are merely illustrative of the invention and that other approaches can be utilized which fall within the scope of the present invention as defined in the appended claims.

The invention is claimed in accordance with the following:

1. An electrical circuit locator apparatus for locating electrical conductor means which may be energized by a voltage including an alternating-current voltage of power frequency or which may be entirely unenergized comprising:

a signal generator means including a source of D.C. supply independent of the electrical conductor means for generating a signal at a predetermined frequency, filter-discriminator means provided by said signal generator means for filtering out the power frequency and thereby isolating said signal generator from said power frequency of the electrical conductor means when the electrical conductor means are in an energized condition;

means for selectively connecting said signal generator means through said filter-discriminator means to selected electrical conductor means at one location; test loop means selectively connectable in shunt with the output of said signal generator means for checking proper operation of the apparatus;

detecting means operative to detect only said predetermined frequency including a power source independent of said electrical conducting means for energizing said detecting means for operation;

means including a signal pick-up means connected to said detecting means for coupling to said electrical conductor means at another location for picking up said predetermined frequency; and indicating means operated by said detecting means, when it senses said predetermined frequency, for providing an indication when the signal pick-up means is coupled to an electrical conductor means at the another location which is in electrical continuity with the selected electrical conductor means at the one location regardless of whether it is directly energized by said power frequency or non-energized, said signal pick-up means comprising coil means for coupling to the elctrical conductor means at the another location and being provided with filter-discriminator means for filtering out the A. C. power frequency and electrically isolating said pick-up means from the conductor means at said A.C. power frequency.

2. An electrical circuit locator means according to claim 1 wherein said signal generator means comprises oscillator circuit means to generate said predetermined frequency and amplifier means to amplify the output from said oscillator circuit means.

3. An electrical circuit locator means according to claim 1 wherein said detecting means comprises an ammeter.

* * * * *